United States Patent [19]
Sawada et al.

[11] Patent Number: 5,957,545
[45] Date of Patent: Sep. 28, 1999

[54] FLUID HOLDING VEHICLE RESERVOIR FOR PREVENTING LEAKAGE OF FLUID

[75] Inventors: Masashi Sawada, Chiryu; Mitsuharu Hayashi, Nishio; Takashi Nagashima, Nukata-gun; Toshihito Suzuki, Chiryu; Ken Sakakibara, Kariya, all of Japan

[73] Assignee: Aisin Seiki Kabushiki Kaisha, Kariya, Japan

[21] Appl. No.: 08/921,510

[22] Filed: Sep. 2, 1997

[30] Foreign Application Priority Data

Sep. 3, 1996 [JP] Japan ..................................... 8-233296
Dec. 20, 1996 [JP] Japan ..................................... 8-341138

[51] Int. Cl.⁶ ..................................................... B60T 17/00
[52] U.S. Cl. ................................................. 303/1; 60/585
[58] Field of Search .............................. 303/1; 200/84 C; 60/562, 578, 585, 583, 535, 534, 592; 137/265; 220/304, 374

[56] References Cited

U.S. PATENT DOCUMENTS

| | | | |
|---|---|---|---|
| 4,297,846 | 11/1981 | Cadeddu | 60/585 |
| 4,355,512 | 10/1982 | Kubota et al. | 60/534 |
| 4,385,495 | 5/1983 | Kobota | 60/535 |

FOREIGN PATENT DOCUMENTS 3-27017  6/1991  Japan.

*Primary Examiner*—Robert J. Oberleitner
*Assistant Examiner*—Hargobind S. Sawhney
*Attorney, Agent, or Firm*—Burns, Doane, Swecker & Mathis, LLP

[57] ABSTRACT

A master cylinder reservoir for use in an automotive vehicle includes a main body, a reserving chamber formed in the main body for storing operating fluid, a pouring opening provided at one end of the upper portion of the main body to permit introduction of the operating fluid into the reserving chamber, and a blocking device provided in the main body for preventing a leakage of the operating fluid outside the main body via the pouring opening.

19 Claims, 7 Drawing Sheets

FLUID HOLDING VEHICLE RESERVOIR FOR PREVENTING LEAKAGE OF FLUID

FIELD OF THE INVENTION

The present invention generally relates to fluid reservoirs. More particularly, the present invention pertains to vehicle reservoirs, e.g., master cylinder reservoirs, for storing operating fluid such as brake fluid.

BACKGROUND OF THE INVENTION

Conventional reservoirs for use in automotive vehicles, which are referred to as master cylinder reservoirs, include a main body in which is defined a reserving chamber and a pouring opening located adjacent the reserving chamber. The pouring opening is formed at the upper portion of the main body and is positioned at the forward vehicle side of the main body.

To introduce an amount of operating or brake fluid into the reserving chamber, a reservoir cap must first be removed from the pouring opening and the operating fluid is then supplied in the reserving chamber through the pouring opening. The pouring opening is then once again closed by the reservoir cap. The reserving chamber is in fluid communication with the pouring opening, and the reservoir cap which closes the pouring opening is formed with a vent hole for introducing atmospheric air into the reserving chamber so that the reserving chamber is under atmospheric pressure.

In this type of reservoir, when the brake is applied during forward movement of the vehicle, the upper surface of the operating fluid becomes inclined such that the operating fluid surface extends diagonally upward in the forward vehicle direction. It has been found that when the upper surface of the fluid experiences this type of inclination, if the distance between the fluid surface and the pouring opening is insufficient, leakage of the operating fluid outside the reservoir through the vent hole inevitably occurs. Such leakage of the operating fluid is, of course, highly undesirable,

SUMMARY OF THE INVENTION

A need exists, therefore for a reservoir that is not susceptible to the foregoing disadvantages and drawbacks.

It would thus be desirable to provide a reservoir which is not susceptible to leakage of the operating fluid, particularly when the operating fluid is subjected to a force tending to cause the fluid to become inclined.

In accordance with the present invention, a master cylinder reservoir for use in an automotive vehicle includes a main body, a reserving chamber formed in the main body for storing operating fluid so that the portion of the reserving chamber located above the upper surface of the operating fluid defines an upper portion of the reserving chamber, a pouring opening provided in the main body for allowing operating fluid to be introduced into the reserving chamber, and a blocking arrangement provided in the main body for preventing the operating fluid in the reserving chamber from leaking exteriorly of the main body via the pouring opening.

According to another aspect of the invention, a master cylinder reservoir used in an automotive vehicle for holding operating fluid includes a main body, a reserving chamber formed in the main body for storing operating fluid so that the portion of the reserving chamber located above the upper surface of the operating fluid defines an upper portion of the reserving chamber, and a pouring opening formed in the main body for introducing operating fluid into the reserving chamber. A blocking wall is provided in the main body to separate the reserving chamber from the pouring opening so that an intermediate space is defined between the reserving chamber and the pouring opening. The blocking wall is provided with a hole that communicates the reserving chamber with the pouring opening. A first member is removably fitted in the hole of the blocking wall for preventing operating fluid in the reserving chamber from flowing into the intermediate space, and a second member is removably mounted on the pouring opening and provided with a vent hole for establishing communication between the intermediate space and the atmosphere. A passage is also formed in the main body and extends within the reserving chamber. The passage has a first end terminating at the blocking wall and communicating with the intermediate space, and a second opposite end terminating in the upper portion of the reserving chamber.

In accordance with another aspect of the invention, a vehicle reservoir used in an automotive vehicle for holding fluid includes a main body having a top portion, a reserving chamber formed in the main body for storing fluid, a pouring opening formed in the top portion of the main body for introducing fluid into the reserving chamber, and a blocking wall provided in the main body to separate the reserving chamber from the pouring opening to prevent fluid in the reserving chamber from leaking outside the main body by way of the pouring opening.

BRIEF DESCRIPTION OF THE DRAWING FIGURES

The above and other features of the present invention will be more apparent from the following detailed description considered with reference to the accompanying drawing figures in which like elements are designated by like reference numerals and wherein.

DETAILED DESCRIPTION OF THE INVENTION

Figure 1:
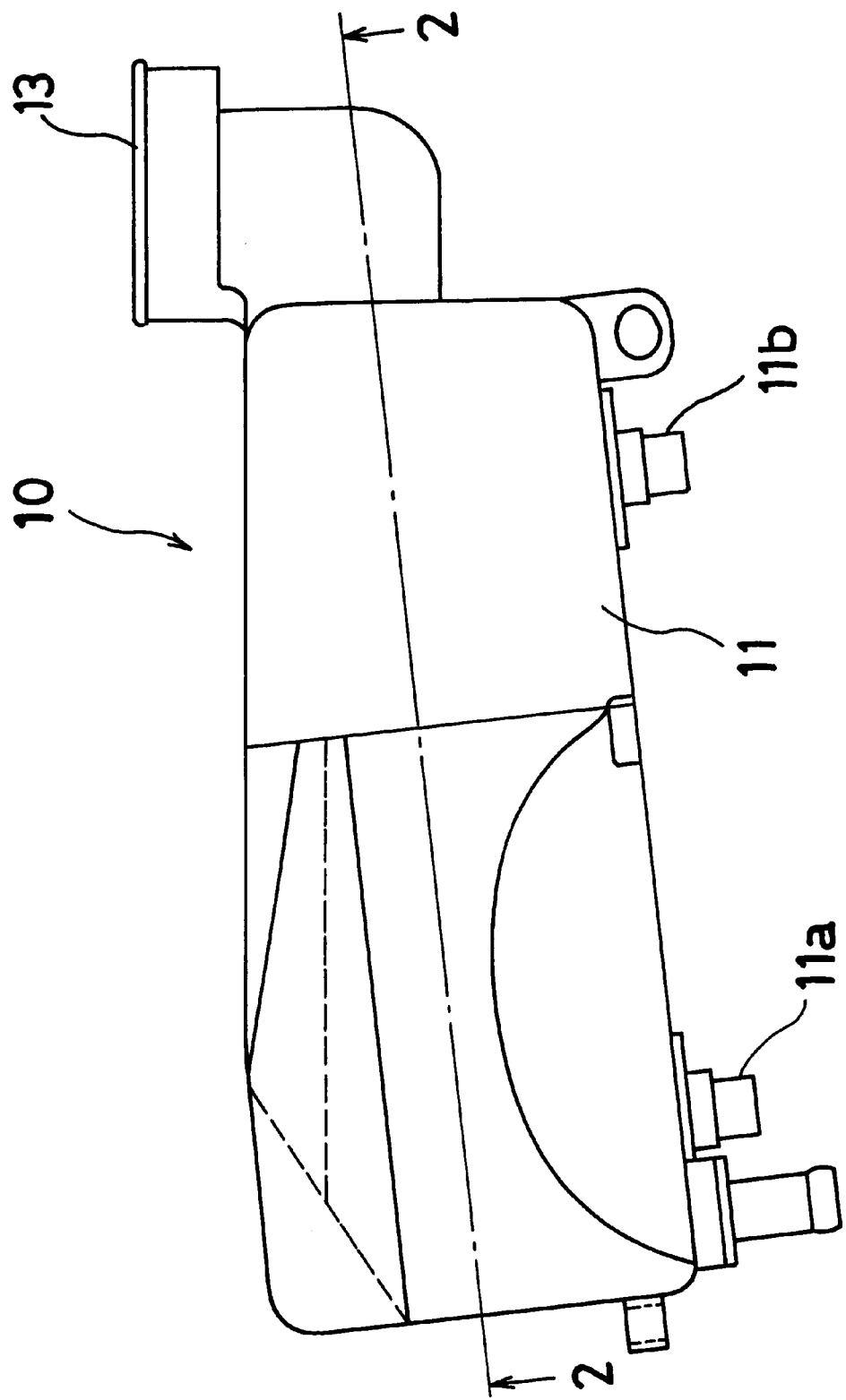
FIG. 1 is a side view of a first embodiment of a vehicle reservoir according to the present invention.

Referring initially to FIGS. 1–4, which illustrate a first embodiment of the present invention, a master cylinder reservoir 10 is adapted to be mounted on a tandem master cylinder which is of a well-known construction. The master cylinder reservoir 10 includes a main body 11 molded of a synthetic resin. Because the main body 11 is formed through molding, a parting line 50 is formed. A reserving chamber 12 is defined within the main body for storing an amount of operating fluid or brake fluid 14. A pouring opening 13 is provided on the top or upper side portion at one end of the main body for allowing the operating fluid to be introduced into the reserving chamber 12.

Figure 2:
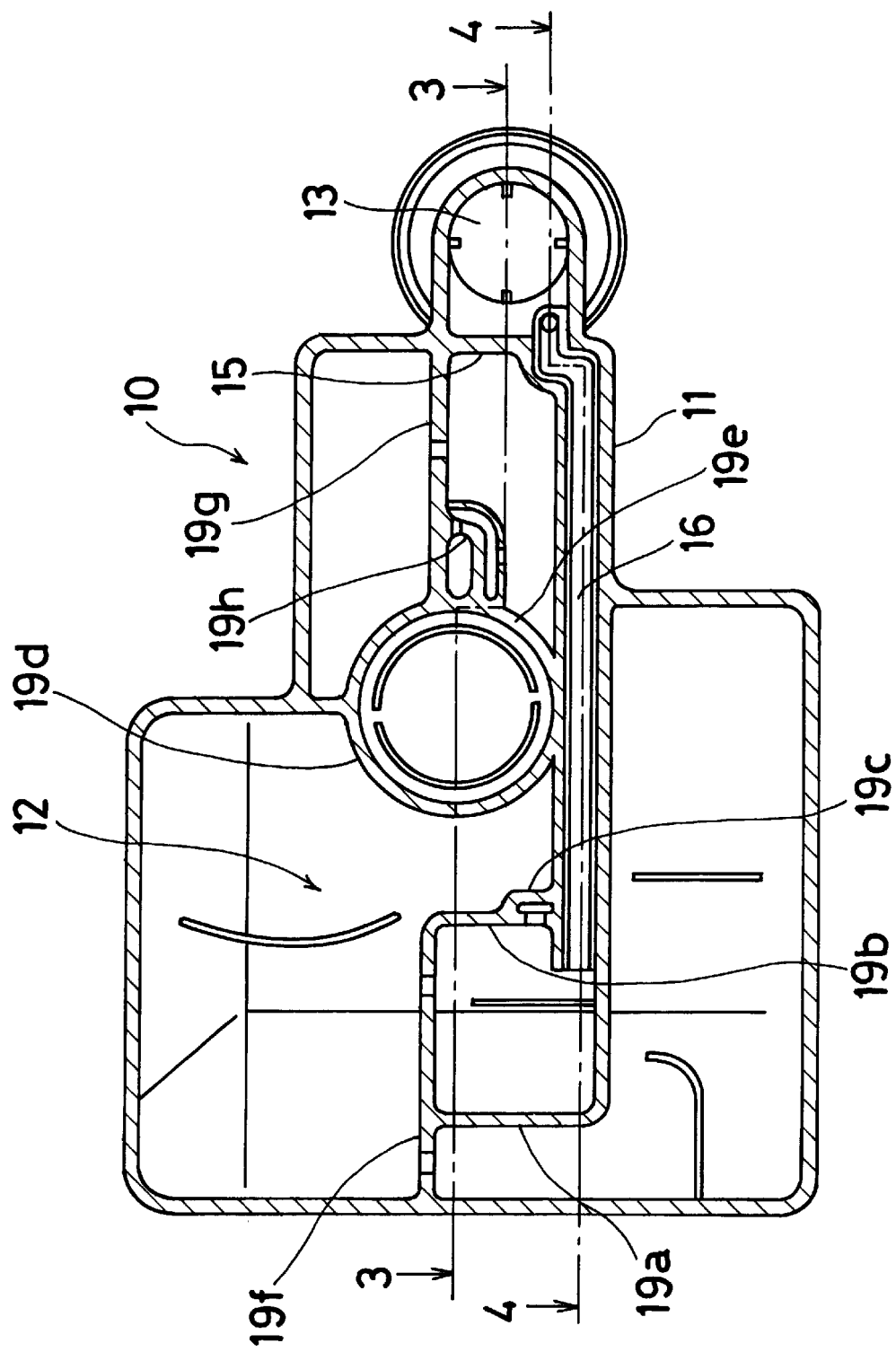
FIG. 2 is a cross-sectional view of the vehicle reservoir taken along the section line 2—2 in FIG. 1.
Figure 3:
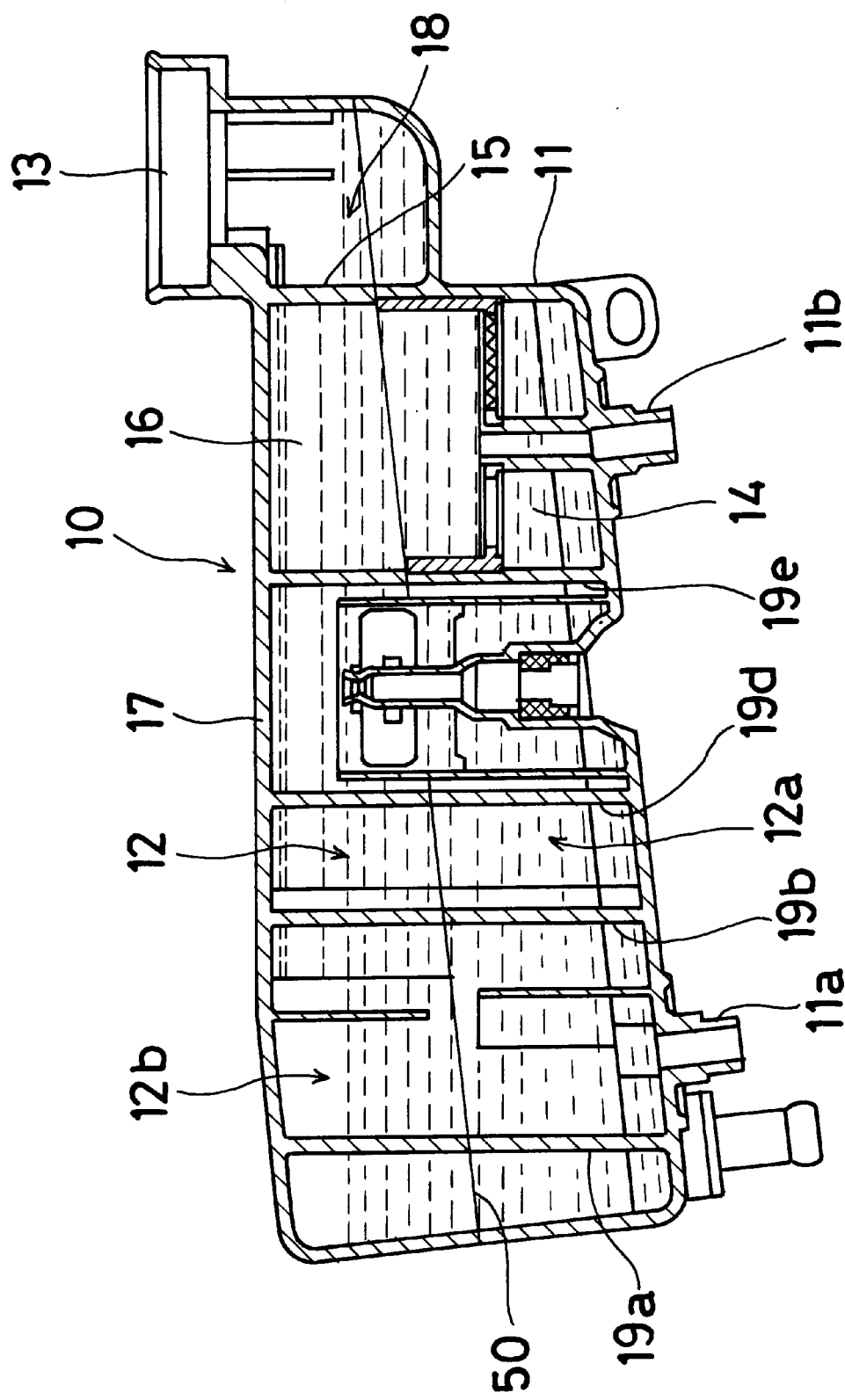
FIG. 3 is a cross-sectional view of the vehicle reservoir taken along the section line 3—3 in FIG. 2.
Figure 4:
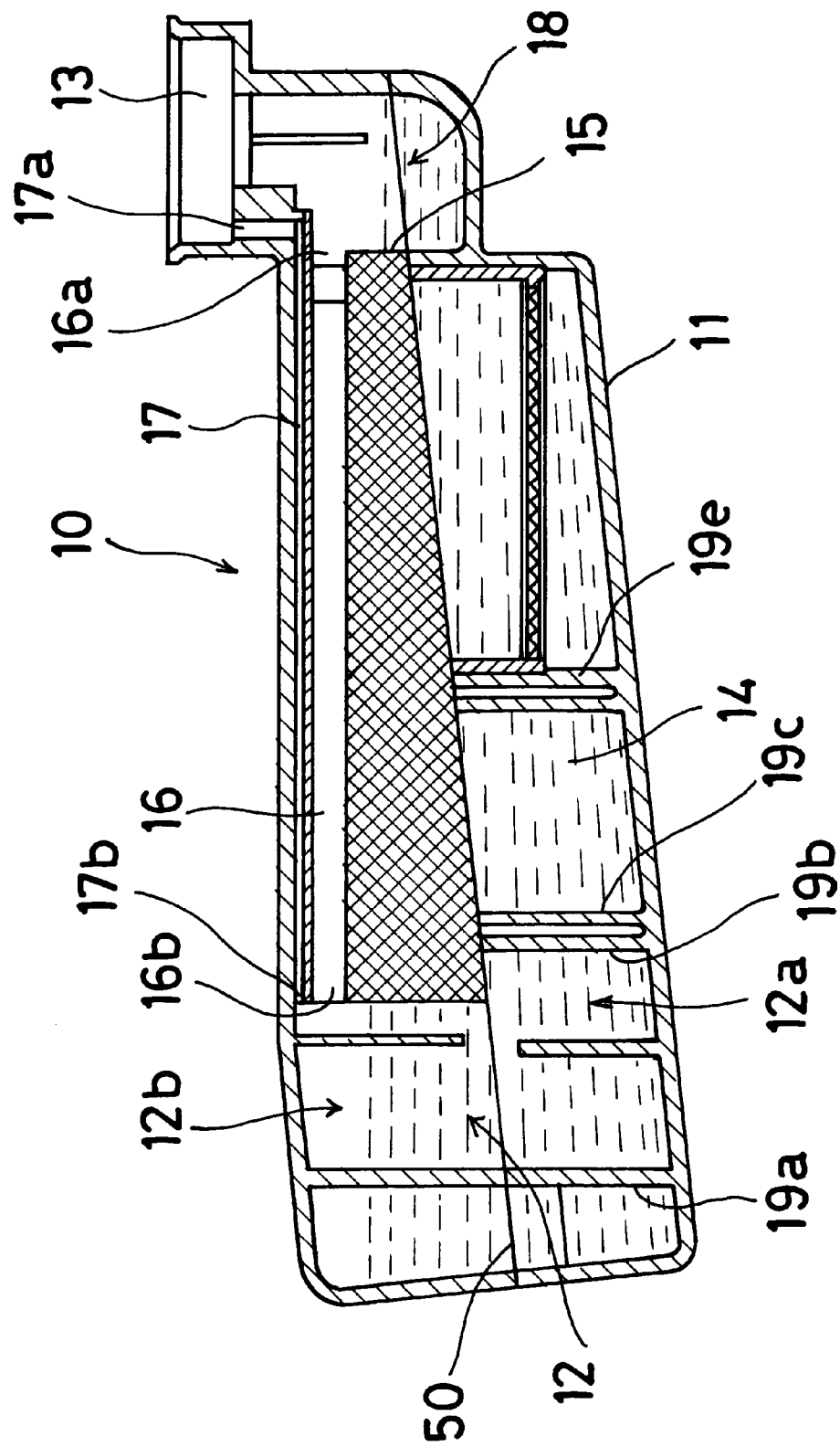
FIG. 4 is a cross-sectional view of the vehicle reservoir taken along the section line 4—4 in FIG. 2.

As particularly seen with reference to FIGS. 2–4, the reserving chamber 12 is divided into a plurality of divisions or chamber portions by partition walls 19a, 19b, 19c, 19d, 19e, 19f, 19g, 19h. The two divisions forming each pair of adjacent divisions are continually in fluid communication with each other by a respective hole formed in each of the partition walls 19a, 19b, 19c, 19d, 19e, 19f, 19g, 19h. In a known manner, the reserving chamber 12 is designed to be in fluid communication with the operating chambers of the tandem master cylinder. This communication can be made possible by respective holes or ports 11a, 11b formed in the bottom wall of the main body 11.

The operating fluid 14 is stored in the reserving chamber 12 so that the lower portion 12a of the reserving chamber 12 is filled with operating fluid. The portion of the reserving chamber 12 located above the upper free surface of the operating fluid 14 defines an upper portion or space 12b of the reserving chamber. This upper portion 12b of the reserving chamber 12 is located in the upper half of the reservoir 10.

A blocking wall 15 is provided towards one end of the master cylinder reservoir to separate or isolate the reserving chamber 12 from the pouring opening 13. This blocking wall 15 is formed integrally with the remainder of the master cylinder reservoir. Positioned between the pouring opening 13 and the blocking wall 15 is an intermediate space 18.

Also formed in the main body 11 is a fluid passage 16 having opposite ends at which are provided respective openings 16a, 16b. The passage 16 extends along the vehicle lengthwise direction. In FIG. 4, the left side corresponds to the vehicle backward or rearward direction while the right side corresponds to the vehicle forward or frontward direction. The opening 16a at the forward end of the passage 16 terminates in the blocking wall 15 so that the opening 16a is exposed to and in communication with the pouring opening 13, while the opening 16b at the rearward end of the passage 16 terminates at and is exposed to the upper portion 12b of the reserving chamber 12. Thus, the fluid passage 16 establishes a fluid communication between the pouring opening 13 and the upper portion 12a of the reserving chamber 12.

An air passage 17 is provided above the fluid passage 16 and is oriented parallel to the fluid passage 16. The air passage 17 has opposite ends at which are provided respective openings 17a, 17b. The opening 17a at the forward end of the air passage 17 is connected to or in communication with the pouring opening 13 while the opening 17b at the rearward end of the air passage 17 is connected to or in communication with the upper portion 12b of the reserving chamber 12. As best seen in FIG. 4, the opening 17a of the air passage 17 is located above the opening 16a of the fluid passage 16.

The top end of the pouring opening 13 is adapted to receive a rubber cap (not specifically shown). The rubber cap, which is of a known construction, is designed to be removably mounted on the pouring opening 13. The cap is provide with a hole for communicating the air passage 17 with the atmosphere so that atmospheric pressure is introduced into the air passage 17. The cap is adapted to be temporarily removed from the top end of the pouring opening 13 to allow the operating fluid to be poured into the pouring opening 13.

The operating fluid 14 poured into the pouring opening 13 is stored in the lower portion 12a of the reserving chamber 12 after passing through the intermediate space 18 below the opening 13 and the fluid passage 16. Depending on the amount of operating fluid 14 that is dispensed into the master cylinder reservoir 12, the volume of the lower portion 12a of the reserving chamber 12 which holds the fluid varies. The volume of the lower portion 12a of the reserving chamber 12 which holds the operating fluid varies in reverse proportion to the volume of the upper portion 12b of the reserving chamber 12 which does not contain operating fluid.

As the introduction of the operating fluid 14 into the reserving chamber 12 proceeds, the air in the upper portion 12b of the reserving chamber 12b passes through the air passage 17 and the pouring opening 13 where it is expelled outside the main body 11.

When the vehicle brake is applied during forward vehicle movement, the surface of the operating fluid 14 in the master cylinder reservoir 10 changes from a generally level condition in which the operating fluid surface is generally horizontal to a condition in which the operating fluid surface is inclined. This inclination occurs as a result of inertia and causes the portion of the operating fluid surface at the forward side (i.e., the right side as seen in FIG. 4) to rise.

However, notwithstanding this phenomena, the movement of the operating fluid 14 toward the pouring opening 13 is prevented by the blocking wall 15. In addition, the opening 16b of the fluid passage 16 terminates in a position at the rear side of the upper portion 12b of the reserving chamber 12 (i.e., at the upper portion of the reserving chamber 12 that does not contain operating fluid). Such an arrangement is advantageous in that it prevents leakage of the operating fluid 14 from the opening 16b to the pouring opening 13 through the fluid passage 16. Thus, there is no possibility that the operating fluid 14 will leak outside the master cylinder reservoir 10 via the pouring opening 13 and the hole in the cap.

As illustrated in FIG. 4, a small amount of operating fluid 14 remains in the intermediate space 18 when the introduction of the operating fluid 14 into the reserving chamber 12 is completed. When the vehicle brake is applied, the surface of the operating fluid 14 in the intermediate space 18 tends to become inclined, but because the amount of operating fluid 14 and the volume of the intermediate space 18 are so small, such inclination of the surface of the operating fluid 14 fails to reach the pouring opening 13. Thus, there is no possibility of leakage of the operating fluid 14 outside the master cylinder reservoir 10 from the space 18 via the pouring opening 13 and the cap.

In addition, even though inclination of the surface of the operating fluid 14 occurs in a similar manner when the vehicle is inclined, leakage of the operating fluid 14 outside the master cylinder reservoir 10 does not occur for reasons similar to those discussed above.

The foregoing advantages associated with the master cylinder reservoir 10 of the present invention are particularly desirable when the pouring opening 13 is positioned at the front or forward side of the vehicle. That is because in this position of the pouring opening 13, leakage of the operating fluid through the opening 13 and the cap is particularly of concern as the fluid tends to incline upwardly towards the pouring opening when the vehicle brake is applied during forward vehicle movement.

It is to be recognized that the air passage 17 is quite advantageous in that it enables the air in the reserving chamber 12 to be smoothly expelled outside the master cylinder reservoir 10 while the operating fluid 14 is being supplied into the reserving chamber 12. This thus facilitates the introduction or supply of the operating fluid 14 into the reserving chamber 12.

The structure of the blocking wall 15 can modified or changed, for example by positioning the wall at a different portion of the master cylinder reservoir, so long as the blocking wall 15 is able to function in the manner described above and provide the aforementioned advantages.

Figure 5:
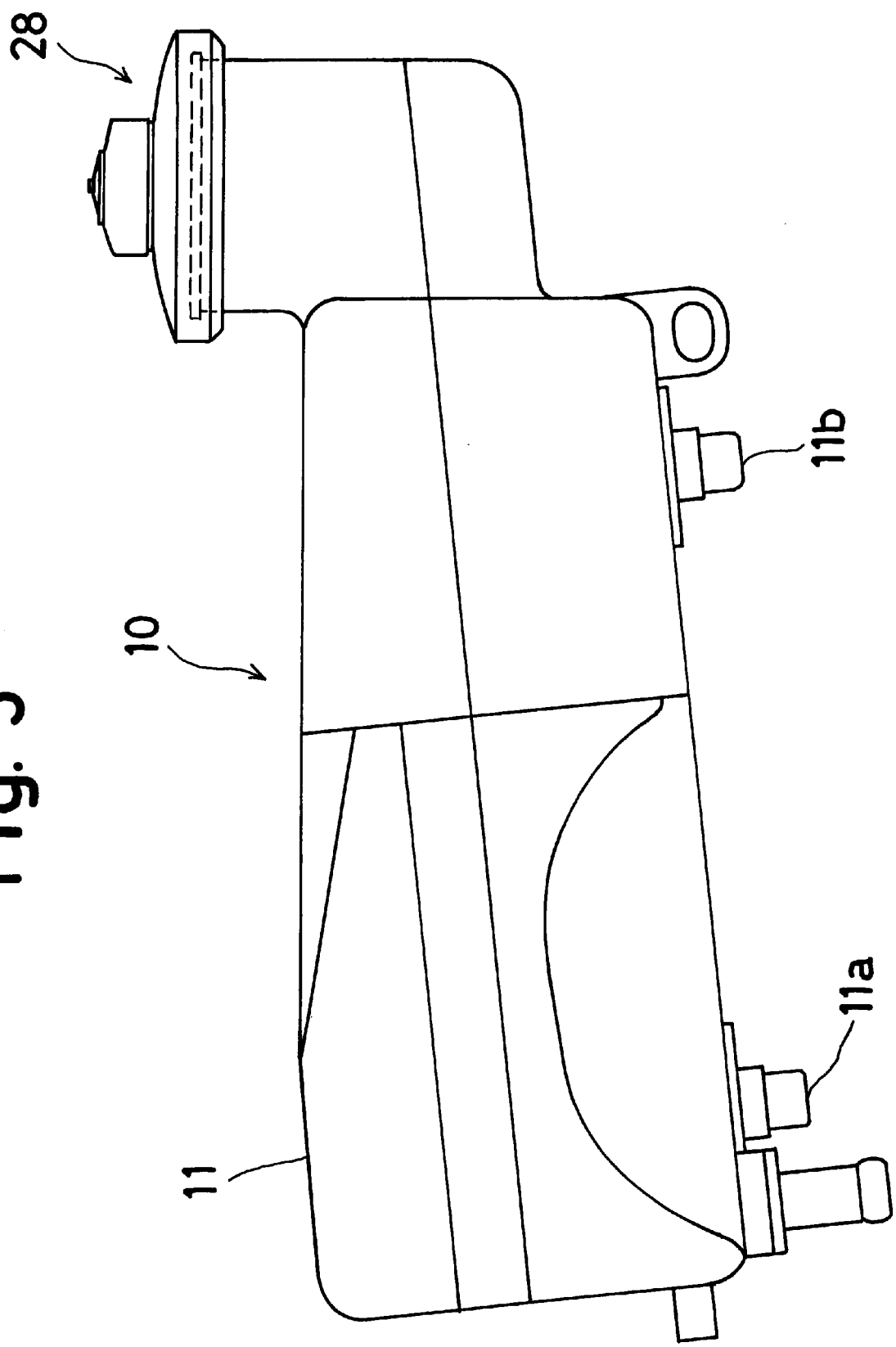
FIG. 5 is a side view of a second embodiment of a vehicle reservoir according to the present invention.
Figure 6:
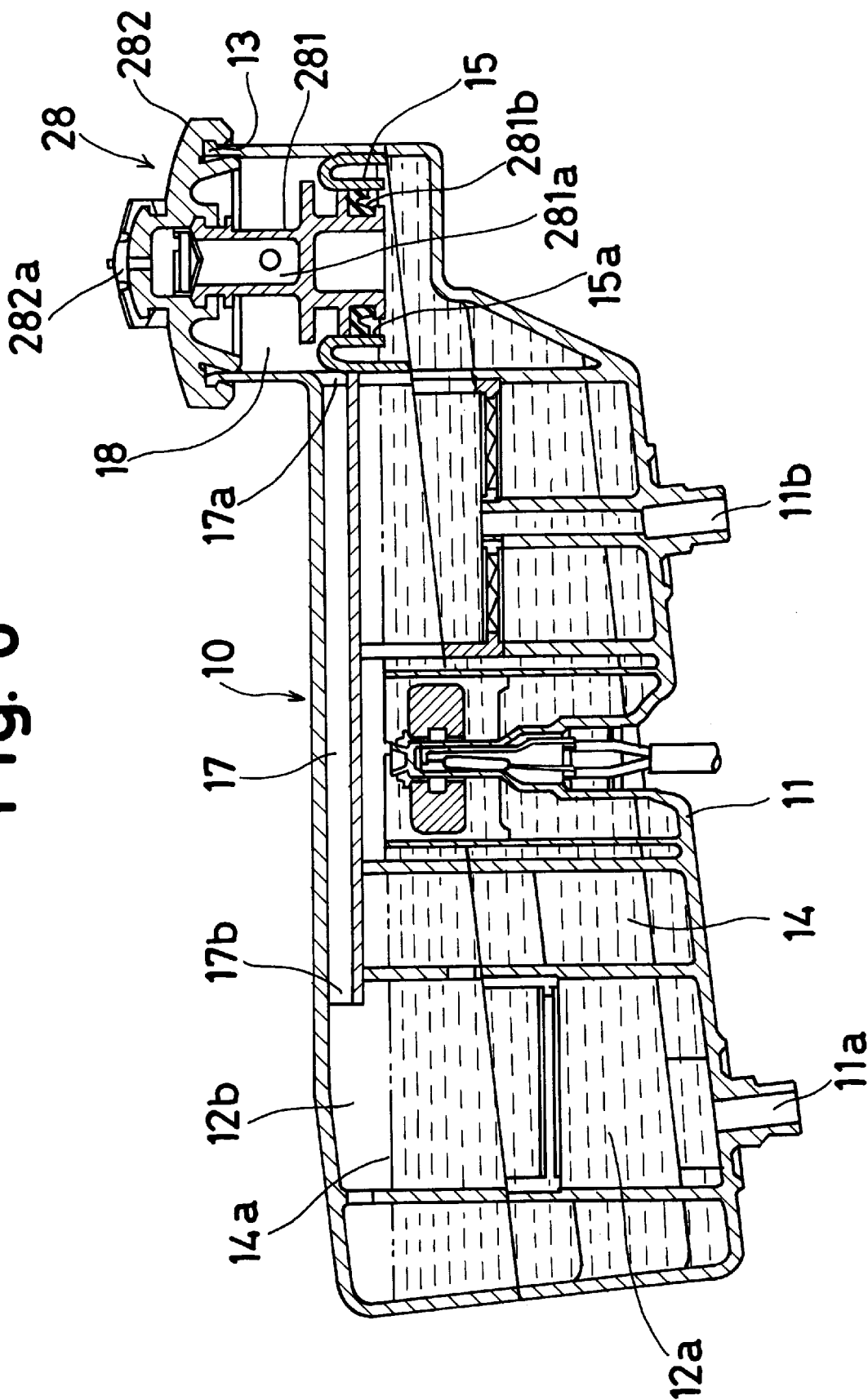
FIG. 6 is a cross-sectional view of the embodiment of the vehicle reservoir shown in FIG. 5.
Figure 7:
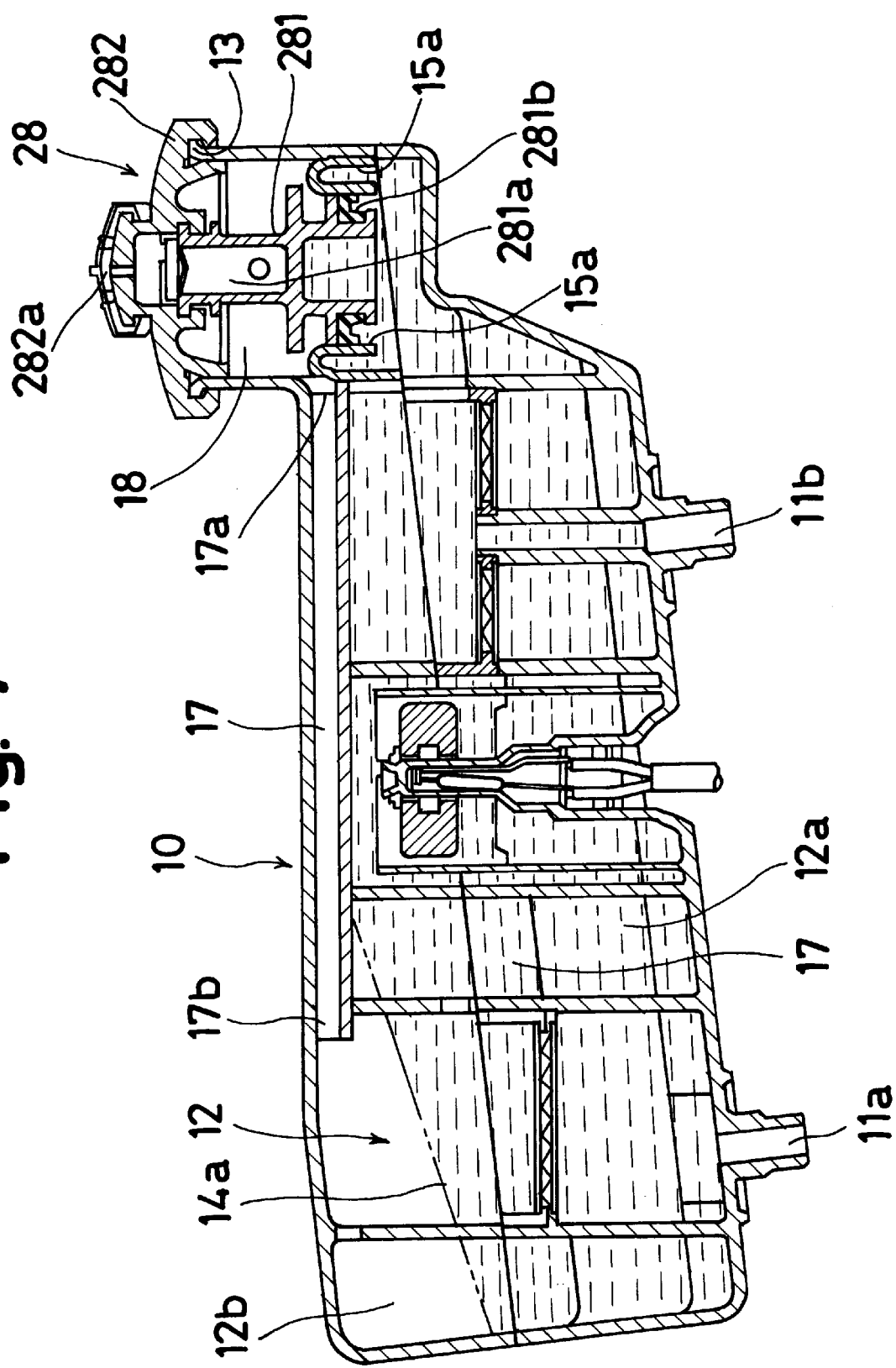
FIG. 7 is a cross-sectional view of the embodiment of the vehicle reservoir shown in FIG. 5 illustrating how the fluid in the reservoir behaves during operation.

A second embodiment of the master cylinder master cylinder reservoir 10 is illustrated in FIGS. 5–7. As in the embodiment described above, the master cylinder master cylinder reservoir 10 is adapted to be mounted on a tandem master cylinder (not shown) which is of a known construction.

The master cylinder master cylinder reservoir 10 includes a main body 11 which is made of a synthetic resin. A reserving chamber 12 is formed within the main body 11 for storing an amount of operating or brake fluid 14. A pouring opening 13 is provided at the top end or upper end portion at one end of the main body 11 for pouring the operating fluid 14 into the reserving chamber 12.

As in the embodiment described above, the reserving chamber 12 is divided into a plurality of divisions by a plurality of partition walls. Each of the partition walls is provided with a hole for establishing continual fluid communication between the two divisions forming each pair of adjacent divisions. The reserving chamber 12 is also in fluid communication with operating chambers of the tandem master cylinder via respective ports 11a, 11b which are formed at the bottom of the main body 11.

In use, the lower portion 12a of the reserving chamber 12 is filled with operating fluid 14 while an upper portion 12b or space of the reserving chamber 12 that does not contain operating fluid is located above the operating fluid surface.

As best shown in FIGS. 6 and 7, a blocking wall 15 is integrally formed at a forward end of the reservoir 10. The blocking wall 15 separates the reserving chamber 12 from the pouring opening 13 so that an intermediate space 18 is defined between the reserving chamber 12 and the pouring opening 13. The blocking wall 15 is formed by a portion of the reservoir that is turned back upon itself as seen in FIG. 6. The blocking wall 15 is provided with a hole 15a which establishes fluid communication between the intermediate space 18 and the reserving chamber 12.

An air passage 17 is provided in the main body 11 in the reserving chamber 12. The air passage 17 extends in the vehicle lengthwise direction. One end 17a of the air passage 17 terminates at the blocking wall 15 so that the air passage 17 is in communication with the intermediate space 18. The other end 17b of the air passage 17 terminates in the upper portion 12b of the reserving chamber 12. The one end 17a of the air passage 17 is located at the forward side of the reserving space with reference to the forward vehicle direction while the other end 17b of the air passage 17 is located at the rearward side of the reserving chamber 12 with reference to the rearward vehicle direction.

A master cylinder reservoir cap 28 is removably or detachably mounted on the pouring opening 13. The cap 28 includes a first portion 281 which is fitted into the hole 15a in the blocking wall 15 and a second portion 282 which receives an annular distal end of the pouring opening 13. The second portion 282 of the cap is made of a resilient synthetic resin while the first portion 281 of the cap is made of a hard synthetic resin. As seen in FIG. 6, the first portion 281 is fitted to the second portion 282 so that the two portions 281, 282 of the cap are assembled to one another as a one piece unit and so that the first portion 281 depends from and extends downwardly from the second portion 282.

The first portion 281 of the cap 28 is provided with a first vent hole 281a and the second portion 282 of the cap is provided with a second vent hole 282a. The first and second vent holes 281a, 282a establish communication between the intermediate space 18 and the atmosphere. A fluid-tight connection between the blocking wall 15 and the first portion 281 of the cap 28 is assured by a sealing member 281b which surrounds the lower part of the first portion and is disposed between the blocking wall 15 and the first portion 281 of the cap 28.

To introduce operating fluid 14 into the reserving chamber 12, the cap 28 is first removed from the pouring opening 13. Thereafter, the operating fluid 14 is dispensed into the pouring opening 13 so that the fluid passes the pouring opening 13 and the hole 15a in the blocking wall 15, and is supplied into the reserving chamber 12. While the operating fluid 14 is being introduced into the reserving chamber 12 in this manner, air in the upper portion 12b of the reserving portion 12 is expelled outside the main body 11 of the master cylinder reservoir 10 through the air passage 17, the intermediate space 18, the first vent hole 281a in the cap 28 and the second vent hole 282a in the cap 28. When the desired amount of operating fluid 14 has been introduced into the reserving chamber, the pouring opening 13 is closed by the cap 28.

When the vehicle brake is applied during forward vehicle movement, the upper free surface 14a of the operating fluid 14 tends to move from a substantially level or horizontal orientation to an inclined orientation by virtue of inertia. Thus, the portion of the upper surface of the operating fluid disposed towards the front side of the vehicle tends to rise in the manner shown in FIG. 7.

However, despite this phenomena, the movement of the operating fluid 14 towards the front side of the reservoir is prevented by the blocking wall 15 and the first portion 281 of the cap 28 which is connected in a fluid-tight manner to the blocking wall 15. Thus, leakage of the operating fluid 14 outside the master cylinder reservoir 10 through the intermediate space 18 and the vent holes 281a and 282a does not occur. Similarly, even if the vehicle becomes inclined so that the forward end of the vehicle is raised, the operating fluid is prevented from leaking exteriorly of the reservoir 10 through the pouring opening 13.

Due to the integrated structure of the first portion 281 and the second portion 282 of the cap 28, the pouring opening 13 and the hole 15a in the blocking wall 15 can be simultaneously closed by the first portion 281 and the second portion 282 of the cap 28, respectively.

In the foregoing embodiments, the reservoir of the present invention has been described in the context of a master cylinder reservoir. However, it is to be understood that the construction of the reservoir can be applied to other reservoir devices in a vehicle such as a fluid operated booster or the like and a fluid pressure controlled device.

The principles, various embodiments, and modes of operation of the present invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A master cylinder reservoir for use in an automotive vehicle comprising:
   a main body;
   a reserving chamber formed in the main body for storing operating fluid such that an upper portion of the reserving chamber is located above an upper surface of the operating fluid;
   a pouring opening provided in the main body for allowing operating fluid to be introduced into the reserving chamber;
   blocking means provided in the main body for preventing the operating fluid in the reserving chamber from leaking exteriorly of the main body via the pouring opening;
   a fluid passage having a first end and an oppositely located second end, the first end of the fluid passage being in communication with the pouring opening, the second end of the fluid passage being in communication with only the upper portion of the reserving chamber.

2. A master cylinder reservoir as set forth in claim 1, wherein the pouring opening is positioned at an upper portion of the main body on a first side of the main body, the blocking means including a wall, the wall being located between the pouring opening and a second side of the main body positioned opposite the first side, the fluid passage being provided in the reserving chamber and being adapted to be located above the upper surface of the operating fluid, the first end of the fluid passage terminating in the wall, the second end of the fluid passage terminating at a position located towards the second side of the main body.

3. A master cylinder reservoir as set forth in claim 2, wherein the first side of the main body is adapted to be positioned towards a front side of the vehicle while the second side of the main body is adapted to be positioned towards a rear side of the vehicle.

4. A master cylinder reservoir as set forth in claim 2, including an air passage provided in the reserving chamber of the main body at a position above the fluid passage, the air passage extending from the pouring opening towards the second side of the main body for communicating the upper portion of the reserving chamber with atmosphere.

5. A master cylinder reservoir as set forth in claim 1, wherein the blocking means includes a blocking wall that separates the reserving chamber from the pouring opening so that an intermediate space is defined between the reserving chamber and the pouring opening.

6. A master cylinder reservoir as set forth in claim 5, wherein the blocking wall has a hole communicating the reserving chamber with the intermediate space.

7. A master cylinder reservoir for use in an automotive vehicle comprising:
   a main body;
   a reserving chamber formed in the main body for storing operating fluid such that an upper portion of the reserving chamber is located above an upper surface of the operating fluid;
   a pouring opening provided in the main body for allowing operating fluid to be introduced into the reserving chamber; and
   a blocking wall provided in the main body for preventing the operating fluid in the reserving from leaking exteriorly of the main body via the pouring opening, said blocking wall separating the reserving chamber from the pouring opening to define an intermediate space between the reserving chamber and the pouring opening, said blocking wall being provided with a hole communicating the reserving chamber with the intermediate space;
   a first member positioned in the hole in the blocking wall for closing the hole; and
   a passage formed in the main body and extending in the reserving chamber so that a first end of the passage is connected to the intermediate space and an opposite second end of the passage terminates in the upper portion of the reserving chamber.

8. A master cylinder reservoir as set forth in claim 7, including a second member closing the pouring opening, the second member having a vent hole for establishing communication of the intermediate space with atmosphere.

9. A master cylinder reservoir as set forth in claim 8, wherein the first member and the second member form a one-piece cap.

10. A master cylinder reservoir as set forth in claim 1, including a plurality of partition walls disposed within the reserving chamber for dividing the reserving chamber into a plurality of chamber portions.

11. A master cylinder reservoir used in an automotive vehicle for holding operating fluid, comprising:
    a main body;
    a reserving chamber formed in the main body for storing operating fluid such that an upper portion of the reserving chamber is located above an upper surface of the operating fluid;
    a pouring opening formed in the main body for introducing operating fluid into the reserving chamber;
    a blocking wall provided in the main body to separate the reserving chamber from the pouring opening so that an intermediate space is defined between the reserving chamber and the pouring opening, the blocking wall being provided with a hole communicating the reserving chamber with the pouring opening;
    a first member removably fitted in the hole of the blocking wall for preventing operating fluid in the reserving chamber from flowing into the intermediate space;
    a second member removably mounted on the pouring opening and provided with a vent hole for establishing communication between the intermediate space and atmosphere; and
    a passage having a first end terminating at the blocking wall and communicating with the intermediate space, and a second opposite end terminating in the upper portion of the reserving chamber.

12. A master cylinder reservoir as set forth in claim 11, wherein the main body includes a first side and an oppositely positioned second side, the pouring opening being positioned at an upper portion of the main body at the first side of the main body, the second end of the passage being positioned closer to the second side of the main body than the first end of the passage.

13. A master cylinder reservoir as set forth in claim 12, wherein the one side of the main body is adapted to b e positioned towards a front side of the vehicle.

14. A master cylinder reservoir as set forth in claim 11, wherein the first member and the second member are formed as a one-piece unit.

15. A vehicle reservoir used in an automotive vehicle for holding fluid, comprising:
    a main body having a top portion;
    a reserving chamber formed in the main body for storing fluid such that an upper portion of the reserving chamber is located above an upper surface of the fluid;

a pouring opening formed in the top portion of the main body for introducing fluid into the reserving chamber;

a blocking wall provided in the main body to separate the reserving chamber from the pouring opening to prevent fluid in the reserving chamber from leaking outside the main body by way of the pouring opening;

a fluid passage formed in the main body, the fluid passage having oppositely positioned first and second ends, the first end of the fluid passage terminating at the blocking wall and communicating with the pouring opening, and the second end of the fluid passage being in communication with only the upper portion of the reserving chamber in a condition in which the upper surface of the operating fluid is generally horizontal to thereby provide communication between the pouring opening and the upper portion of the reserving chamber to permit fluid introduced into the pouring opening to flow through the fluid passage and into the reserving chamber.

16. A vehicle reservoir as set forth in claim 15, including an air passage formed in the main body, the air passage extending within the reserving chamber between the pouring opening and the upper portion of the reserving chamber for communicating the upper portion of the reserving chamber with atmosphere.

17. A vehicle reservoir as set forth in claim 15, including an intermediate space located between the reserving chamber and the pouring opening, the blocking wall being provided with a hole communicating the reserving chamber with the intermediate space.

18. A vehicle reservoir used in an automotive vehicle for holding fluid, comprising:

a main body having a top portion;

a reserving chamber formed in the main body for storing fluid;

a pouring opening formed in the top portion of the main body for introducing fluid into the reserving chamber;

a blocking wall provided in the main body to separate the reserving chamber from the pouring opening to prevent fluid in the reserving chamber from leaking outside the main body by way of the pouring opening an intermediate space located between the reserving chamber and the pouring opening;

a hole provided at the blocking wall for communicating the reserving chamber with the intermediate space; and a cap for closing the pouring opening, the cap including a first member removably fitted in the hole of the blocking wall for preventing operating fluid in the reserving chamber from flowing into the intermediate space, and a second member removably mounted on the pouring opening and provided with a vent hole for establishing communication between the intermediate space and atmosphere.

19. A vehicle reservoir as set forth in claim 17, including a cap for closing the pouring opening, the cap including a first member removably fitted in the hole of the blocking wall for preventing operating fluid in the reserving chamber from flowing into the intermediate space, and a second member removably mounted on the pouring opening and provided with a vent hole for establishing communication between the intermediate space and atmosphere.

* * * * *